R. B. TOLLES.
Optical Instrument.
No. 13,603.
Patented Sept. 25, 1855.
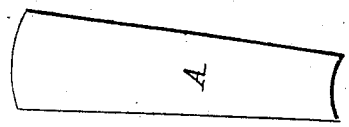
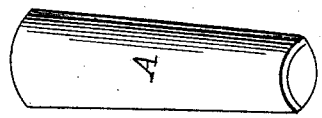
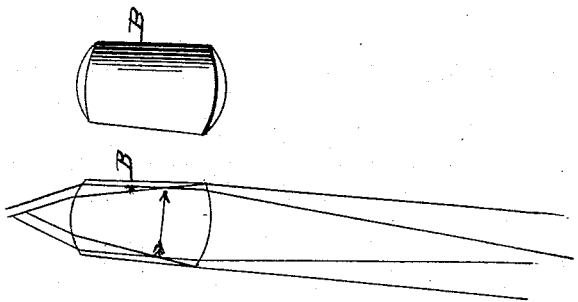
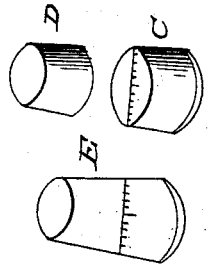

UNITED STATES PATENT OFFICE.

ROBT. B. TOLLES, OF CANASTOTA, NEW YORK.

OPTICAL INSTRUMENT.

Specification of Letters Patent No. 13,603, dated September 25, 1855.

*To all whom it may concern:*

Be it known that I, ROBERT B. TOLLES, of Canastota, in the county of Madison and State of New York, have invented a new and useful Improvement in Optical Instruments; and I do hereby declare the following to be a full, clear, and exact description of the construction and operation of the same, reference being had to the annexed drawings, making part of this specification.

The nature of my invention consists in constructing of a solid piece such optical instruments or parts thereof as at present are composed of two separate lenses and having an actual focus between them, the effect of such construction being to produce a focus or image within the solid transparent substance between the refracting surfaces.

The construction and operation of my invention are as follows: Take a piece of glass B (of refraction index 1.50) of one inch in length, and of the diameter say one half inch or more, and cylindrical in form. Make the curve of the larger end 0.85 (fifty five one hundredths,) inch radius, and that of the smaller end 0.44 inch radius. By placing this solid transparent piece at a proper distance within the focus of any object glass it will act as a negative eyepiece. The two refracting surfaces acting as two equivalent separate lenses with a focus or image formed between. This solid optical piece may be substituted in all cases which have heretofore required the action of two separate lenses with a focus between. The solid optical piece (B) may be made a micrometer eyepiece as shown at (E), by being constructed of two plano convex pieces (C—D) and cemented at their plane sides, and their cemented surfaces being at the point of focal distance of the eye surface or smaller end of the eyepiece, and one of said surfaces engraved with micrometer lines.

I do not claim the invention of a solid optical piece consisting of two exterior refracting surfaces, when such surfaces operate as a single lens of greater or less thickness; but

What I claim and desire to secure by Letters Patent of the United States is—

The construction of a solid optical piece the exterior refracting surfaces of which shall produce the effect of two equivalent lenses said surfaces being at such a distance from each other as shall form a focus or image within the solid transparent substance, thereby supporting two refracting surfaces substantially as set forth.

ROBERT B. TOLLES.

Witnesses:
R. F. STEVENS,
J. HUNT.